(12) United States Patent
Mizuno

(10) Patent No.: US 12,170,175 B2
(45) Date of Patent: Dec. 17, 2024

(54) MULTI-LAYER CERAMIC CAPACITOR

(71) Applicant: TAIYO YUDEN CO., LTD., Tokyo (JP)

(72) Inventor: Kotaro Mizuno, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 18/358,786

(22) Filed: Jul. 25, 2023

(65) Prior Publication Data
US 2023/0377805 A1 Nov. 23, 2023

Related U.S. Application Data

(63) Continuation of application No. 17/589,344, filed on Jan. 31, 2022, now Pat. No. 11,756,737.

(30) Foreign Application Priority Data

Mar. 2, 2021 (JP) .................................. 2021-032288

(51) Int. Cl.
*H01G 4/30* (2006.01)
*H01G 4/012* (2006.01)
*H01G 4/12* (2006.01)

(52) U.S. Cl.
CPC ............... *H01G 4/30* (2013.01); *H01G 4/012* (2013.01); *H01G 4/1227* (2013.01)

(58) Field of Classification Search
CPC .......... H01G 4/30; H01G 4/065; H01G 4/012; H01G 4/1209; H01G 4/1227; H01G 4/33
See application file for complete search history.

(56) References Cited

U.S. PATENT DOCUMENTS

| 2012/0234462 | A1 | 9/2012 | Matsui et al. | ............ 156/89.12 |
|---|---|---|---|---|
| 2013/0340920 | A1 | 12/2013 | Matsui et al. | ............ 156/89.12 |
| 2014/0301015 | A1* | 10/2014 | Kim | ........................ H01G 4/12 29/25.03 |
| 2014/0345779 | A1 | 11/2014 | Matsui et al. | ............ 156/89.12 |
| 2015/0348712 | A1* | 12/2015 | Lee | ......................... H01G 4/30 156/89.12 |

(Continued)

FOREIGN PATENT DOCUMENTS

| JP | 2012-209539 A | 10/2012 |
|---|---|---|
| JP | 2018-063969 A | 4/2018 |

*Primary Examiner* — Michael P McFadden
(74) *Attorney, Agent, or Firm* — Stein IP, LLC

(57) ABSTRACT

A multi-layer ceramic capacitor includes: a multi-layer unit including ceramic layers laminated in a first direction and electrodes disposed between the ceramic layers, positions of end portions of the electrodes falling within a range of 0.5 μm in a second direction; and side margins each containing manganese or magnesium and silicon and facing each other in the second direction. When each margin is equally divided into an inner region and an outer region, a total concentration of manganese and magnesium in the outer region is higher than a total concentration of manganese and magnesium in the inner region and higher than a total concentration of manganese and magnesium in the ceramic layers, and a concentration of silicon in the inner region is not less than a concentration of silicon in the outer region and higher than a concentration of silicon in the ceramic layers.

4 Claims, 7 Drawing Sheets

(56) References Cited

U.S. PATENT DOCUMENTS

| | | | |
|---|---|---|---|
| 2016/0196918 A1* | 7/2016 | Hong | H01G 4/232 361/301.4 |
| 2018/0102217 A1 | 4/2018 | Fukunaga | H01G 4/1227 |
| 2018/0182555 A1* | 6/2018 | Kowase | H01G 4/30 |
| 2018/0301282 A1* | 10/2018 | Nishikawa | C04B 35/62272 |
| 2019/0035554 A1* | 1/2019 | Inomata | H01G 4/12 |
| 2019/0371528 A1* | 12/2019 | Takashima | H01G 4/232 |

\* cited by examiner

MULTI-LAYER CERAMIC CAPACITOR

CROSS-REFERENCE TO RELATED APPLICATIONS

This is a continuation application of U.S. application Ser. No. 17/589,344, filed Jan. 31, 2022, which claims the benefit of Japanese Application No. 2021-032288, filed Mar. 2, 2021, in the Japanese Patent Office. All disclosures of the documents named above are incorporated herein by reference.

BACKGROUND ART

The present disclosure relates to a multi-layer ceramic capacitor including a side margin.

A multi-layer ceramic capacitor in which a side margin has been provided in a later step to a side surface of a multi-layer unit in which ceramic layers and internal electrodes are laminated is known (see, for example, Japanese Patent Application Laid-open No. 2012-209539). This configuration is advantageous for the miniaturization and increase in the capacity of the multi-layer ceramic capacitor because the side surface of the multi-layer unit, from which the internal electrodes are exposed, can be reliably protected even with a thin side margin.

From the viewpoint of extending the crossing area of internal electrodes, it is favorable that the side margin is thinner. Meanwhile, in the multi-layer ceramic capacitor, in the case where a high voltage is applied to the internal electrodes, the ferroelectricity of the ceramic layer can cause electrolytic strain. In the case where the side margin is thin, structural defects such as cracks are likely to occur due to stress caused by the electrolytic strain, and it is difficult to achieve sufficient withstand voltage characteristics.

Meanwhile, a technology of adding elements such as Mg and Mn to the region located between the internal electrode and the side surface to promote densification of ceramics is known (see, for example, Japanese Patent Application Laid-open No. 2018-063969).

SUMMARY OF THE INVENTION

However, in the case where at least one element of Mg or Mn is added to the side margin, the added element diffuses into the ceramic layer of the multi-layer unit to reduce the dielectric constant of the ceramic layer and the electrostatic capacity of the multi-layer ceramic capacitor decreases in some cases.

In view of the circumstances as described above, it is desirable to provide a multi-layer ceramic capacitor capable of improving withstand voltage characteristics and suppressing the decrease in the electrostatic capacity.

Additional or separate features and advantages of the disclosure will be set forth in the descriptions that follow and in part will be apparent from the description, or may be learned by practice of the disclosure. The objectives and other advantages of the disclosure will be realized and attained by the structure particularly pointed out in the written description and claims thereof as well as the appended drawings.

To achieve these and other advantages and in accordance with the purpose of the present disclosure, as embodied and broadly described, in one aspect, the present disclosure provides a multi-layer ceramic capacitor, including: a multi-layer unit; a first side margin; and second side margin.

The multi-layer unit includes a plurality of ceramic layers laminated in a direction of a first axis and a plurality of internal electrodes disposed between the plurality of ceramic layers. Positions of end portions of the plurality of internal electrodes in a direction of a second axis perpendicular to the first axis fall within a range of 0.5 μm in the direction of the second axis.

The first side margin and the second side margin each contain at least one of manganese or magnesium and silicon and face each other in the direction of the second axis with the multi-layer unit sandwiched therebetween.

When each of the first side margin and the second side margin is equally divided, in the direction of the second axis, into a first inner region and a first outer region, the first inner region being in contact with the multi-layer unit,
  a total concentration of manganese and magnesium in the first outer region is higher than a total concentration of manganese and magnesium in the first inner region and higher than a total concentration of manganese and magnesium in the plurality of ceramic layers, and
  a concentration of silicon in the first inner region is equal to or higher than a concentration of silicon in the first outer region and higher than a concentration of silicon in the plurality of ceramic layers.

With the configuration described above, since the first outer region contains a high concentration(s) of manganese and/or magnesium, refinement of crystal grains and densification of ceramics in the first outer region are promoted. Further, since the first inner region contains silicon having a concentration higher than that of the ceramic layer, the glass phase is likely to precipitate in the first inner region. As a result, a first side margin and a second side margin each including a first inner region having high flexibility and a first outer region having high mechanical strength can be obtained. Therefore, in the case where a high voltage is applied to the ceramic layer and mechanical deformation (electrolytic strain) occurs due to the piezoelectric effect, the first inner region releases the stress due to electrolytic strain and the first outer region makes it possible to suppress structural defects such as cracks caused by the stress. As a result, it is possible to improve withstand voltage characteristics of the multi-layer ceramic capacitor.

Further, since the total concentration of manganese and magnesium in the first inner region is lower than that in the first outer region, the diffusion of manganese and/or magnesium into the ceramic layer is suppressed. As a result, it is possible to suppress the decrease in the dielectric constant of the ceramic layer and the decrease in the electrostatic capacity of the multi-layer ceramic capacitor.

The concentration of silicon in the first inner region may be higher than the concentration of silicon in the first outer region.

As a result, it is possible to relatively decrease the concentration of silicon in the first outer region and suppress the precipitation of the glass phase in the first outer region. Therefore, it is possible to enhance the wear resistance on the surface of the first outer region and suppress the appearance defects such as scratches.

For example, dimensions of each of the first side margin and the second side margin in the direction of the second axis may be 13 μm or less.

As a result, it is possible to reduce the size and increase the capacity of the multi-layer ceramic capacitor. In addition, since the first side margin and the second side margin each include the first inner region and the first outer region having the configuration described above, it is possible to reduce the influence of stress due to electrolytic strain while forming the first side margin and the second side margin to be thin and obtain a multi-layer ceramic capacitor having high withstand voltage characteristics.

The multi-layer unit may include
- a capacitance forming unit including the plurality of ceramic layers and the plurality of internal electrodes, and
- a first cover and a second cover each containing at least one of manganese or magnesium and silicon, the first cover and the second cover facing each other in the direction of the first axis with the capacitance forming unit sandwiched therebetween.

When each of the first cover and the second cover is equally divided, in the direction of the first axis, into a second inner region and a second outer region, the second inner region being in contact with the capacitance forming unit,
- a total concentration of manganese and magnesium in the second outer region may be higher than a total concentration of manganese and magnesium in the second inner region and higher than a total concentration of manganese and magnesium in the plurality of ceramic layers, and
- a concentration of silicon in the second inner region may be equal to or higher than a concentration of silicon in the second outer region and may be higher than a concentration of silicon in the plurality of ceramic layers.

With the configuration described above, since the second outer region contains a high concentration(s) of manganese and/or magnesium, refinement of crystal grains and densification of ceramics in the second outer region are promoted. Therefore, it is possible to enhance the wear resistance on the surface of the second outer region and suppress the appearance defects such as scratches.

Further, since the total concentration of manganese and magnesium in the second inner region is lower than that in the second outer region, the diffusion of manganese and/or magnesium into the ceramic layer is suppressed. As a result, it is possible to suppress the decrease in the dielectric constant of the ceramic layer and suppress the decrease in the electrostatic capacity of the multi-layer ceramic capacitor.

In addition, the configuration described above makes it possible to cause the distribution of manganese, magnesium, and silicon in the first cover and the second cover to correspond to the distribution of manganese, magnesium, and silicon in the first side margin and the second side margin. As a result, it is possible to bring the sintering behavior of the first cover and the second cover closer to the sintering behavior of the first side margin and the second side margin and suppress the generation of stress during sintering. Therefore, it is possible to suppress structural defects such as cracks caused by the stress.

In accordance with the present disclosure, it is possible to provide a multi-layer ceramic capacitor capable of improving withstand voltage characteristics and suppressing the decrease in the electrostatic capacity.

These and other objects, features and advantages of the present disclosure will become more apparent in light of the following detailed description of embodiments thereof, as illustrated in the accompanying drawings.

It is to be understood that both the foregoing general description and the following detailed description are exemplary and explanatory, and are intended to provide further explanation of the disclosure as claimed.

DETAILED DESCRIPTION OF THE EMBODIMENTS

Figure 1:
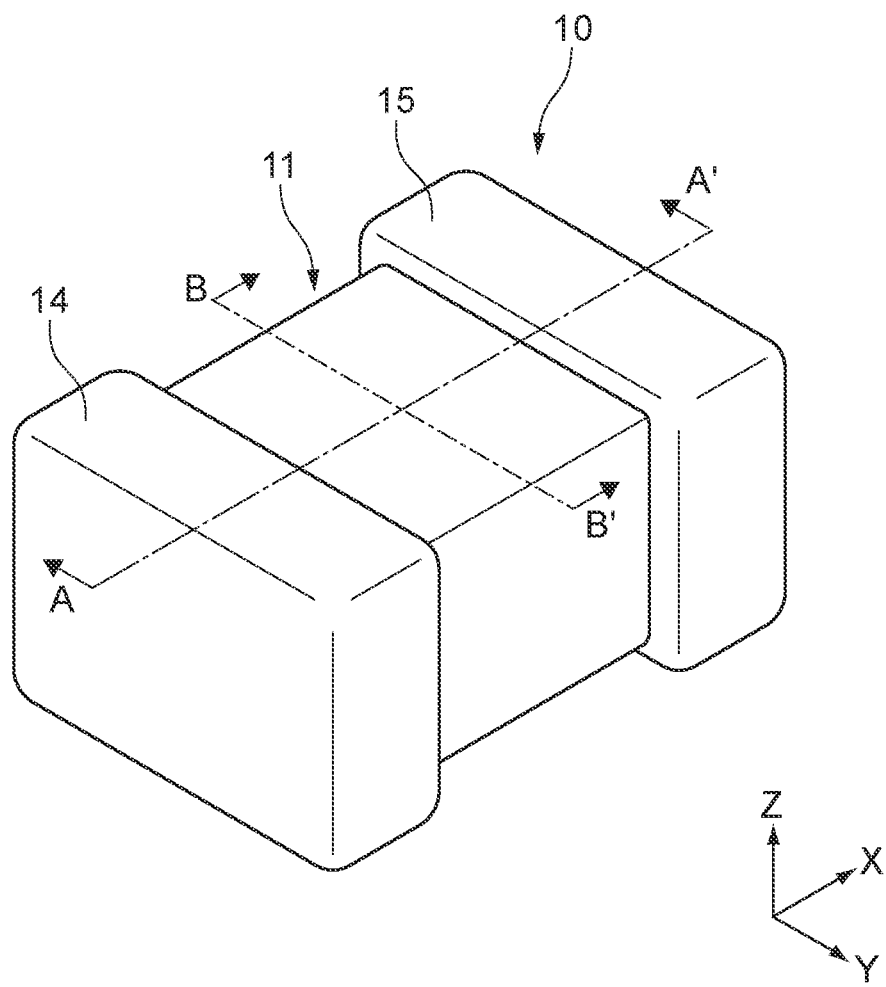
FIG. 1 is a perspective view of a multi-layer ceramic capacitor according to a first embodiment of the present disclosure.

Hereinafter, embodiments of the present disclosure will be described with reference to the drawings.

The X-axis, Y-axis, and Z-axis shown in the drawings are orthogonal to each other, and define the coordinate system to which a multi-layer ceramic capacitor 10 belongs.

I First Embodiment

1. Overall Configuration of Multi-Layer Ceramic Capacitor

Figure 2:
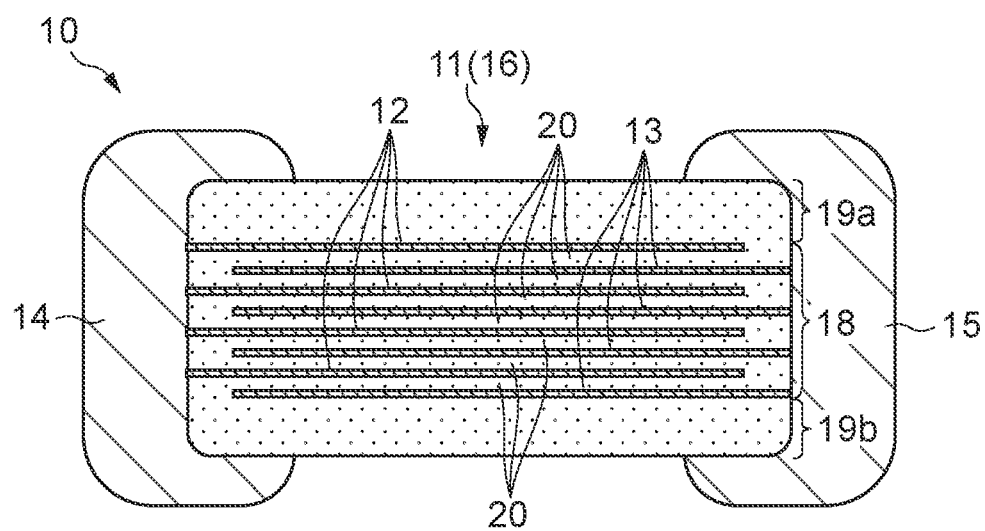
FIG. 2 is a cross-sectional view of the multi-layer ceramic capacitor taken along the A-A' line in FIG. 1.
Figure 3:
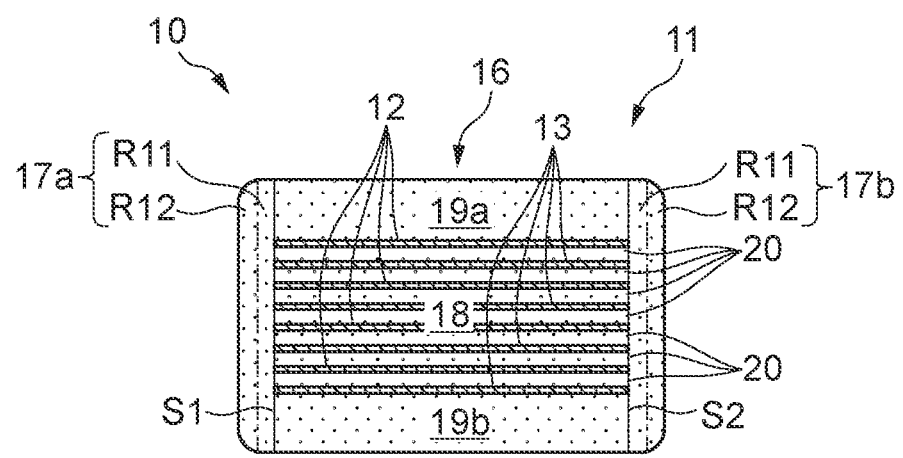
FIG. 3 is a cross-sectional view of the multi-layer ceramic capacitor taken along the B-B' line in FIG. 1.

FIGS. 1 to 3 each show the multi-layer ceramic capacitor 10 according to a first embodiment of the present disclosure. FIG. 1 is a perspective view of the multi-layer ceramic capacitor 10. FIG. 2 is a cross-sectional view of the multi-layer ceramic capacitor 10 taken along the A-A' line in FIG. 1. FIG. 3 is a cross-sectional view of the multi-layer ceramic capacitor 10 taken along the B-B' line in FIG. 1.

The multi-layer ceramic capacitor 10 includes a ceramic body 11, a first external electrode 14, and a second external electrode 15. The ceramic body 11 is formed to have a substantially hexahedron having a first end surface and a second end surface orthogonal to the X-axis direction, a first side surface and a second side surface orthogonal to the Y-axis direction, and a first main surface and a second main surface orthogonal to the Z-axis direction. Ridges connecting the respective surfaces of the ceramic body 11 is rounded, for example.

The multi-layer ceramic capacitor 10 has for example, the following size. The maximum dimension of the multi-layer ceramic capacitor 10 in the X-axis direction is, for example, 0.2 mm or more and 3.5 mm or less. The maximum dimension of the multi-layer ceramic capacitor 10 in the Y-axis direction is, for example, 0.1 mm or more and 2.8 mm or less. The maximum dimension of the multi-layer ceramic capacitor 10 in the Z-axis direction is, for example, 0.1 mm or more and 2.8 mm or less.

The first and second external electrodes 14 and 15 cover the respective end surfaces of the ceramic body 11 and face each other in the X-axis direction with the ceramic body 11 sandwiched therebetween. The first and second external electrodes 14 and 15 shown in FIG. 1 extend from the end surfaces of the ceramic body 11 to the main surface and the side surface. Note that the shape of each of the first and second external electrodes 14 and is not limited to the example shown in FIG. 1.

The first and second external electrodes 14 and 15 are each formed of a good conductor of electricity. Examples of the good conductor of electricity forming the first and second external electrodes 14 and 15 include a metal mainly containing copper (Cu), nickel (Ni), tin (Sn), palladium (Pd), platinum (Pt), silver (Ag), gold (Au), or the like and an alloy of them.

The ceramic body 11 includes a multi-layer unit 16, a first side margin 17a, and a second side margin 17b. The first side margin 17a and the second side margin 17b face each other in the Y-axis direction with the multi-layer unit 16 sandwiched therebetween. The first side margin 17a and the second side margin 17b each cover the multi-layer unit 16 from Y-axis direction.

The multi-layer unit 16 has a first side surface S1 and a second side surface S2 orthogonal to each other in the Y-axis direction. The first side surface S1 and the second side surface S2 each extend along the Z-axis direction and the X-axis direction. Further, the multi-layer unit 16 is formed to have a substantially hexahedron having a first end surface and a second end surface orthogonal to the X-axis direction and a first main surface and a second main surface orthogonal to the Z-axis direction.

The multi-layer unit 16 includes a plurality of ceramic layers 20 laminated in the Z-axis direction, a plurality of first internal electrodes 12 disposed between the plurality of ceramic layers 20, and a plurality of second internal electrodes 13 disposed between the plurality of ceramic layers 20. The ceramic layers 20 are each formed to have a plate shape extending along the X-Y plane. The first and second internal electrodes 12 and 13 are each formed to have a sheet shape extending along the X-Y plane and are alternately disposed along the Z-axis direction. That is, the first and second internal electrodes 12 and 13 face each other in the Z-axis direction with the ceramic layers 20 sandwiched therebetween. The number of layers of the first and second internal electrodes 12 and 13 is not limited to the illustrated example and may be, for example, 30 or more.

The first internal electrodes 12 are drawn to the end surface covered with the first external electrode 14. Meanwhile, the second internal electrodes 13 are drawn to the end surface covered with the second external electrode 15. With this configuration, the first internal electrodes 12 are connected to only the first external electrode 14, and the second internal electrodes 13 are connected to only the second external electrode 15.

With this configuration, in the multi-layer ceramic capacitor 10, when a voltage is applied between the first external electrode 14 and the second external electrode 15, a voltage is applied to the plurality of ceramic layers 20 between the first internal electrodes 12 and the second internal electrodes 13. This allows the multi-layer ceramic capacitor 10 to store charges corresponding to the voltage applied between the first external electrode 14 and the second external electrode 15.

A portion of the multi-layer unit 16 including the plurality of ceramic layers 20 and the plurality of first and second internal electrodes 12 and 13 functions as a capacitance forming unit 18. In addition, the multi-layer unit 16 includes a first cover 19a and a second cover 19b that face each other in the Z-axis direction with the capacitance forming unit 18 sandwiched therebetween. The first cover 19a and the second cover 19b each cover the capacitance forming unit 18 from the Z-axis direction.

In the ceramic body 11, dielectric ceramics having a high dielectric constant are used in order to increase the capacity of each of the ceramic layers 20 between the first and second internal electrodes 12 and 13. Examples of the dielectric ceramics having a high dielectric constant include a material having a Perovskite structure containing barium (Ba) and titanium (Ti), which is typified by barium titanate ($BaTiO_3$).

Note that the ceramic body 11 may have a composition based on strontium titanate ($SrTiO_3$), calcium titanate ($CaTiO_3$), magnesium titanate ($MgTiO_3$), calcium zirconate ($CaZrO_3$), calcium zirconate titanate ($Ca(Zr,Ti)O_3$), barium zirconate ($BaZrO_3$), titanium oxide ($TiO_2$), or the like.

The ceramic layers 20 may each contain, in addition to the main component described above, at least one element of manganese (Mn), magnesium (Mg), or silicon (Si). All of Mn, Mg, and Si have an effect of enhancing the sinterability. For example, Mn and Mg contribute to refinement of crystal grains and densification of ceramics. Meanwhile, excessive amounts of Mn and Mg have an effect of decreasing the dielectric constant. For this reason, the total concentration of Mn and Mg and the concentration of Si in the ceramic layers 20 are appropriately determined considering the sinterability of the ceramic layers 20, the design value of the electrostatic capacity of the multi-layer ceramic capacitor 10, and the like.

Also the first and second covers 19a and 19b are each formed of insulating ceramics, and favorably formed of dielectric ceramics having a composition similar to those of the ceramic layers 20. As a result, it is possible to suppress the generation of stress due to the difference in the physical properties between the multi-layer unit 16 and the first and second covers 19a and 19b.

The thickness of each of the ceramic layers 20 in the Z-axis direction is, for example, 1.0 µm or less from the viewpoint of enhancing the electrostatic capacity, and may be 0.5 µm or less. As the thickness of each of the ceramic layers 20, an average value of thicknesses measured at a plurality of points of the respective ceramic layers 20 can be used. As an example, six layers of the ceramic layers 20 in the field of view observed by a scanning electron microscope are selected and the thickness of each layer is measured at five points. The average value of the obtained thicknesses of 30 points can be used as the thickness of each of the ceramic layers 20.

The first and second internal electrodes 12 and 13 are each formed of a good conductor of electricity. Examples of the good conductor of electricity forming the first and second internal electrodes 12 and 13 typically include nickel (Ni), and include, other than nickel (Ni), a metal mainly containing copper (Cu), palladium (Pd), platinum (Pt), silver (Ag), gold (Au), or the like and an alloy of them.

The thickness of each of the first and second internal electrodes 12 and 13 in the Z-axis direction may be, for example, 0.4 µm or less from the viewpoint of enhancing the electrostatic capacity by forming the capacitance forming unit 18 to have multilayers. As the thickness of each of the first and second internal electrodes 12 and 13, an average value of thicknesses measured at a plurality of points of the respective first and second internal electrodes 12 and 13 can be used. As an example, six layers of the first and second internal electrodes 12 and 13 in the field of view observed by a scanning electron microscope are selected and the thickness of each layer is measured at five points. The average value of the obtained thicknesses of 30 points can be used as the thickness of each of the first and second internal electrodes 12 and 13.

The first and second internal electrodes 12 and 13 are each formed over the entire width of the capacitance forming unit 18 in the Y-axis direction and are exposed on the first and second side surfaces S1 and S2 of the multi-layer unit 16. Positions of the end portions of the first and second internal electrodes 12 and 13 fall within the range of 0.5 μm in the Y-axis direction. The first side margin 17a covers the first side surface S1 of the multi-layer unit 16 and the second side margin 17b covers the second side surface S2 of the multi-layer unit 16. This configuration can ensure insulation properties between the first internal electrodes 12 and the second internal electrodes 13 on the first and second side surfaces S1 and S2 of the multi-layer unit 16.

2. Detailed Configuration of Side Margin

The first and second side margins 17a and 17b are each formed of insulating ceramics, and are favorably formed of dielectric ceramics having a composition similar to those of the ceramic layers 20. As a result, it is possible to suppress the generation of stress due to the difference in the physical properties between the multi-layer unit 16 and the first and second side margins 17a and 17b.

Further, in this embodiment, the first and second side margins 17a and 17b each contain at least one of manganese (Mn) or magnesium (Mg) and silicon (Si).

Since the first side margin 17a and the second side margin 17b are provided in a later step to the multi-layer unit 16 as will be described below, the first side margin 17a and the second side margin 17b can be formed to be thin. For example, the dimensions of the first side margin 17a and the second side margin 17b in the Y-axis direction are 13 μm or less. As a result, it is possible to provide the sufficient crossing area of the first and second internal electrodes 12 and 13, and reduce the size and increase the capacity of the multi-layer ceramic capacitor 10. Note that the dimensions of the first and second side margins 17a and 17b in the Y-axis direction are the maximum dimensions of the first and second side margins 17a and 17b in the Y-axis direction.

In the case where a voltage is applied to the ceramic layers 20 of the multi-layer unit 16 via the first and second external electrodes 14 and 15, mechanical deformation (electrolytic strain) due to the piezoelectric effect occurs in each of the ceramic layers 20 to which the voltage has been applied. In the case where the first and second side margins 17a and 17b are thin, the proportion of the capacitance forming unit 18 in the ceramic body 11 becomes relatively large. For this reason, large stress is caused in the first and second side margins 17a and 17b by the electrolytic strain and structural defects such as cracks can occur.

Meanwhile, it is conceivable that at least one of manganese (Mn) or magnesium (Mg) is added to the first and second side margins 17a and 17b as a sintering aid to refine the crystal grains of the first and second side margins 17a and 17b and enhance the denseness of ceramics. As a result, it is possible to improve the mechanical strength of the first and second side margins 17a and 17b and suppress structural defects due to electrolytic strain.

Meanwhile, in the case where a large amount of Mn and/or Mg added to the first and second side margins 17a and 17b diffuses into the ceramic layers 20, the dielectric constant of the ceramic layers 20 decreases and the electrostatic capacity of the multi-layer ceramic capacitor 10 decreases in some cases.

In this regard, in this embodiment, by equally dividing, in the Y-axis direction, each of the first side margin 17a and the second side margin 17b into a first inner region R11 that is in contact with the multi-layer unit 16 and a first outer region R12 and adjusting the composition of each region as follows, it is possible to suppress structural defects due to electrolytic strain and suppress the decrease in the electrostatic capacity.

The first inner region R11 and the first outer region R12 are regions divided by a virtual plane that equally divides, in the Y-axis direction, the central portion of each of the first and second side margins 17a and 17b in the X-axis direction and the Z-axis direction. The virtual plane is a plane parallel to the X-Z plane. That is, the dimensions in the Y-axis direction of the central portion of the first inner region R11 in the X-axis direction and the Z-axis direction and the dimensions in the Y-axis direction of the central portion of the first outer region R12 in the X-axis direction and the Z-axis direction are equal to each other.

The concentration of the element in each region is obtained by, for example, quantitative measurement with an electron probe micro analyzer (EPMA).

The total concentration of Mn and Mg in the first outer region R12 is higher than the total concentration of Mn and Mg in the first inner region R11 and higher than the total concentration of Mn and Mg in the plurality of ceramic layers 20. As a result, refinement of crystal grains and densification of ceramics in the first outer region R12 are promoted and the mechanical strength of the first outer region R12 can be improved. Note that the first outer region R12 may only at least one of Mn or Mg.

Meanwhile, the concentration of Si of the first inner region R11 is equal to or higher than the concentration of Si of the first outer region R12 and higher than the concentration of Si of the plurality of ceramic layers 20. Si in ceramics can precipitate as a glass phase by sintering. When the first inner region R11 has such a concentration of Si, a relatively soft glass phase imparts flexibility to the first inner region R11.

As a result, in the case where stress is applied to the first and second side margins 17a and 17b by electrolytic strain, the stress is released by the soft first inner region R11 and the first outer region R12 having high mechanical strength prevents structural defects such as cracks from occurring. Therefore, even in the case where a high voltage is applied to the multi-layer ceramic capacitor 10, structural defects of the first and second side margins 17a and 17b are effectively prevented from occurring, and withstand voltage characteristics of the multi-layer ceramic capacitor 10 are enhanced.

Further, in the first outer region R12, since the denseness is enhanced by Mn and/or Mg, the wear resistance on the surface is enhanced. As a result, scratches and the like during handling are suppressed, and the appearance defects of the multi-layer ceramic capacitor 10 are suppressed.

Further, since the total concentration of Mn and Mg in the first inner region R11 is relatively low, diffusion of Mn and/or Mg into the ceramic layers is suppressed. As a result, the decrease in the dielectric constant of the ceramic layers 20 is suppressed, and the decrease in the electrostatic capacity of the multi-layer ceramic capacitor 10 is suppressed.

The concentration of Si in the first and second side margins 17a and 17b may be, for example, uniform. That is, the concentration of Si in the first inner region R11 may be equivalent to the concentration of Si in the first outer region R12.

Alternatively, the concentration of Si in the first inner region R11 may be higher than the concentration of Si in the first outer region R12. As a result, the concentration of Si in the first outer region R12 relatively decreases, and the precipitation of the glass phase in the first outer region R12 is suppressed. Therefore, the wear resistance on the surface of the first outer region R12 is more enhanced, and the appearance defects of the multi-layer ceramic capacitor 10 are more effectively suppressed.

3. Method of Producing Multi-Layer Ceramic Capacitor 10

Figure 4:
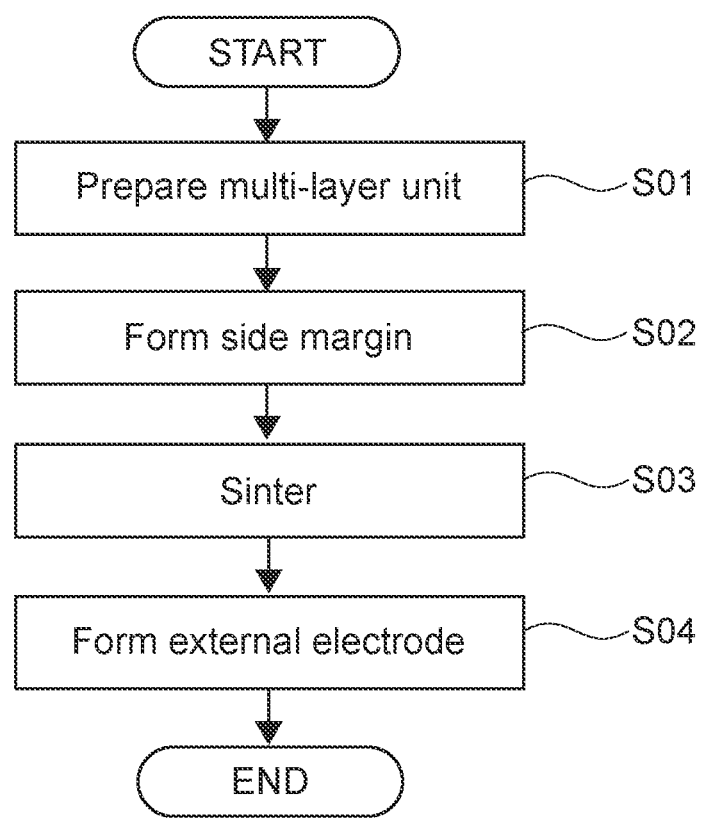
FIG. 4 is a flowchart showing a method of producing the multi-layer ceramic capacitor.
Figure 5:
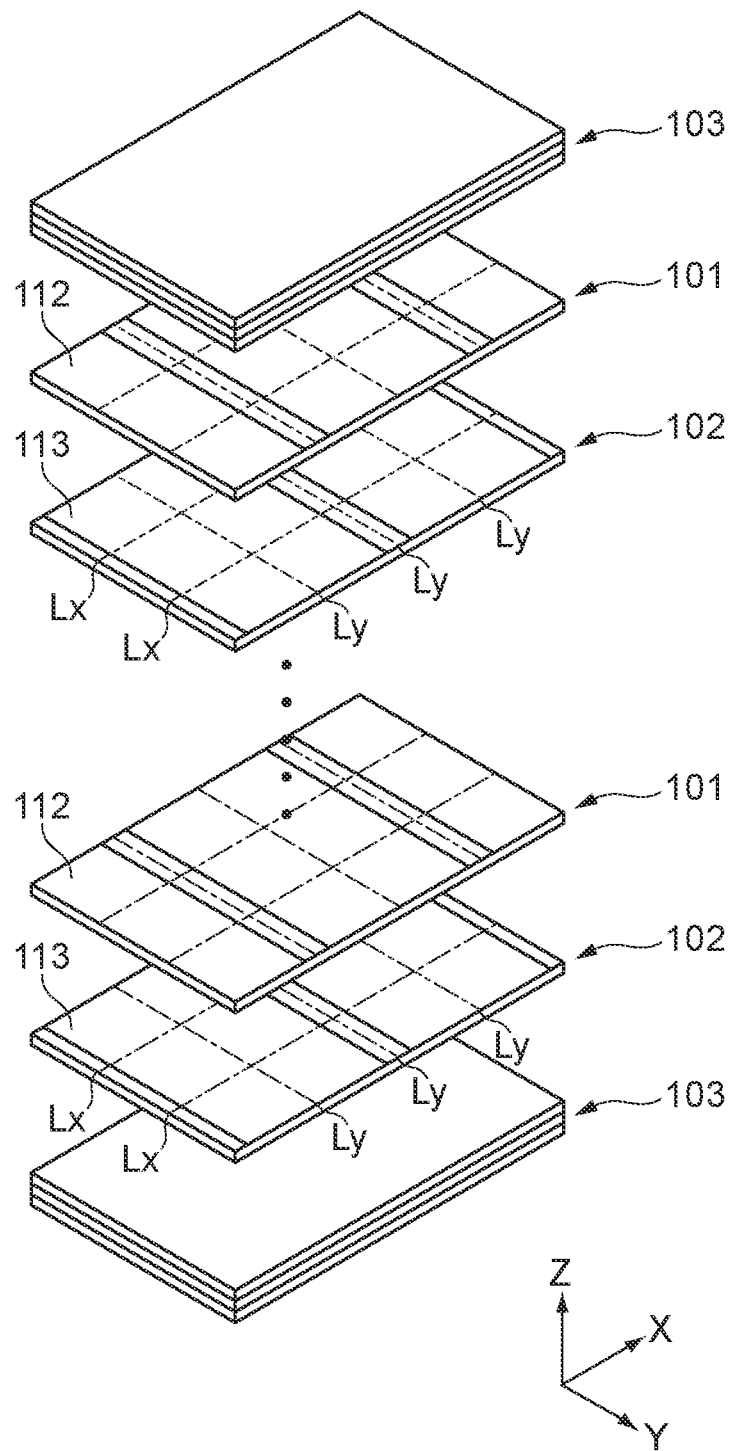
FIG. 5 is a perspective view showing a production process of the multi-layer ceramic capacitor.
Figure 6:
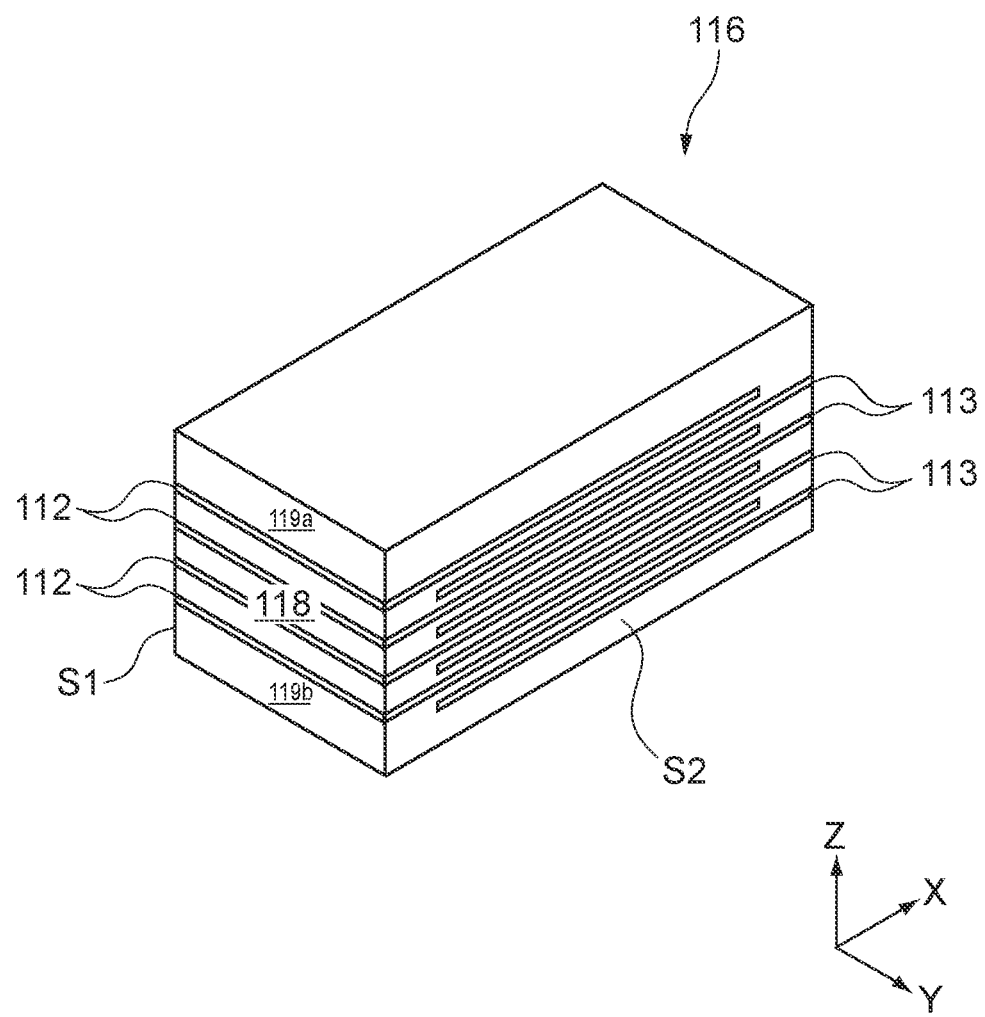
FIG. 6 is a perspective view showing a production process of the multi-layer ceramic capacitor.
Figure 7:
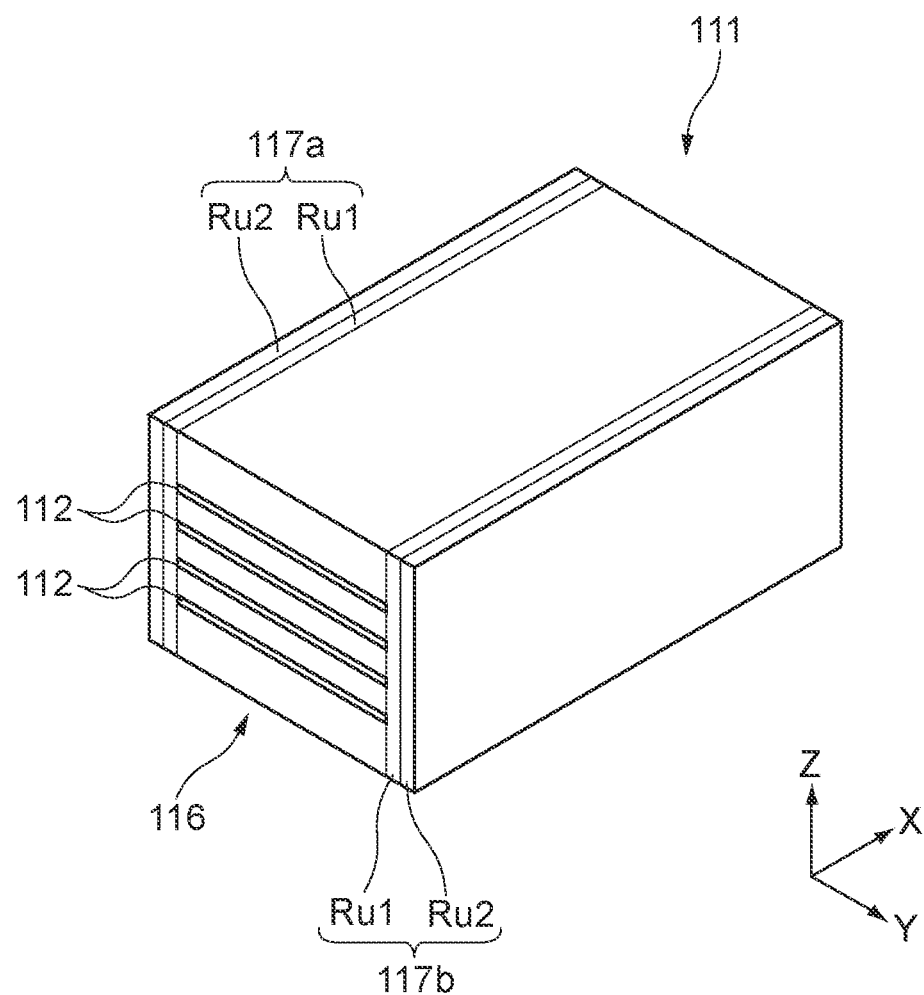
FIG. 7 is a perspective view showing a production process of the multi-layer ceramic capacitor.

FIG. 4 is a flowchart showing a method of producing the multi-layer ceramic capacitor 10. FIG. 5 to FIG. 7 are each a diagram schematically showing a production process of the multi-layer ceramic capacitor 10. A method of producing the multi-layer ceramic capacitor 10 will be described below with reference to FIG. 4 while appropriately referring to FIGS. 5 to 7.

3.1 Step S01: Preparation of Multi-Layer Unit

In Step S01, a first ceramic sheet 101 and a second ceramic sheet 102 for forming the capacitance forming unit 18 and a third ceramic sheet 103 for forming the first and second covers 19a and 19b are laminated and cut to prepare an unsintered multi-layer unit 116.

The first, second, and third ceramic sheets 101, 102, and 103 shown in FIG. 5 are each formed as an unsintered ceramic green sheet containing dielectric ceramics as a main component. The first, second, and third ceramic sheets 101, 102, and 103 are each formed into a sheet shape by using a roll coater or a doctor blade, for example. The thickness of each of the first and second ceramic sheets 101 and 102 is adjusted in accordance with the thickness of the ceramic layers 20 after sintering. The thickness of the third ceramic sheet 103 is adjustable as appropriate.

In the first ceramic sheet 101, an unsintered first internal electrode 112 corresponding to the first internal electrode 12 is formed. In the second ceramic sheet 102, an unsintered second internal electrode 113 corresponding to the second internal electrode 13 is formed. In the third ceramic sheet 103, no internal electrode is formed.

The first and second internal electrodes 112 and 113 each have a plurality of strip-shaped electrode patterns that cross a cutting line Lx parallel to the X-axis direction and extend along a cutting line Ly parallel to the Y-axis direction. The first and second internal electrodes 112 and 113 are formed by applying a conductive paste to the first and second ceramic sheets 101 and 102 by a screen printing method, a gravure printing method, or the like.

As shown in FIG. 5, the first and second ceramic sheets 101 and 102 are alternately laminated in the Z-axis direction. The multi-layer unit of the first and second ceramic sheets 101 and 102 corresponds to the capacitance forming unit 18. The third ceramic sheet 103 is laminated on the upper and lower surfaces of the multi-layer unit of the first and second ceramic sheets 101 and 102 in the Z-axis direction. The multi-layer unit of the third ceramic sheet 103 corresponds to the first and second covers 19a and 19b.

Note that the number of laminates of the first, second, and third ceramic sheets 101, 102, and 103 can be appropriately adjusted.

Subsequently, the multi-layer unit of the first, second, and third ceramic sheets 101, 102, and 103 is pressure-bonded from the Z-axis direction and cut along the cutting lines Lx and Ly. For example, a push-cutting blade or a rotary blade can be used for cutting the multi-layer unit. As a result, the multi-layer unit 116 shown in FIG. 6 is prepared.

As shown in FIG. 6, the multi-layer unit 116 includes an unsintered capacitance forming unit 118 in which the unsintered first and second internal electrodes 112 and 113 are formed, an unsintered first cover 119a, and an unsintered second cover 119b. The multi-layer unit 116 has the first side surface S1 and the second side surface S2 orthogonal to the Y-axis direction, the first end surface and the second end surface orthogonal to the X-axis direction, and the first main surface and the second main surface orthogonal to the Z-axis direction. The first side surface S1 and the second side surface S2 are cutting surfaces corresponding to the cutting line Lx. The first end surface and the second end surface are cutting surfaces corresponding to the cutting line Ly. The end portions of the unsintered first and second internal electrodes 112 and 113 are exposed from the first side surface S1 and the second side surface S2.

3.2 Step S02: Formation of Side Margin

In Step S02, an unsintered first side margin 117a is provided to the first side surface S1 of the multi-layer unit 116 obtained in Step S01 and an unsintered second side margin 117b is provided to the second side surface S2. As a result, as shown in FIG. 7, an unsintered ceramic body 111 in which the first and second side surfaces S1 and S2 from which the first and second internal electrodes 112 and 113 are exposed are covered with the first and second side margins 117a and 117b is obtained.

In this embodiment, the first and second side margins 117a and 117b each includes a first inner layer Ru1 and a first outer layer Ru2. The first inner layer Ru1 is a layer that is in contact with the multi-layer unit 116. The first outer layer Ru2 is a layer disposed outside the first inner layer Ru1 in the Y-axis direction. The first inner layer Ru1 and the first outer layer Ru2 are formed of unsintered ceramic sheets or ceramic slurries having different compositions. The thicknesses of the first inner layer Ru1 and the first outer layer Ru2 in the Y-axis direction are favorably the same but may differ from each other.

The first outer layer Ru2 contains at least one of Mn or Mg. The total concentration of Mn and Mg in the first outer layer Ru2 is higher than the total concentration of Mn and Mg in the first inner layer Ru1 and higher than the total concentration of Mn and Mg in the first and second ceramic sheets 101 and 102.

The first inner layer Ru1 contains Si. The concentration of Si in the first inner layer Ru1 is equal to or higher than the concentration of Si in the first outer layer Ru2 and higher than the concentration of Si in the first and second ceramic sheets 101 and 102.

The first and second side margins 117a and 117b may each be formed using a ceramic sheet for forming the first inner layer Ru1 and a ceramic sheet for forming the first outer layer Ru2. For example, after attaching the ceramic sheet for forming the first inner layer Ru1 to the first and second side surfaces S1 and S2, the ceramic sheet for forming the first outer layer Ru2 may be attached onto the ceramic sheet. Alternatively, a laminated sheet of the ceramic sheet for forming the first inner layer Ru1 and the ceramic sheet for forming the first outer layer Ru2 may be attached to the first and second side surfaces S1 and S2. As an example, by pressing the first and second side surfaces S1 and S2 against the large-sized laminated sheet and punching the laminated sheet with the first and second side surfaces S1 and S2, the laminated sheet can be attached to the first and second side surfaces S1 and S2.

Alternatively, by coating a ceramic slurry for forming the first inner layer Ru1 on each of the first and second side surfaces S1 and S2 and then coating a ceramic slurry for forming the first outer layer Ru2 on the first inner layer Ru1, each of the first and second side margins 117a and 117b may be formed. As the coating method, a coating method, a dipping method, or the like can be used.

3.3 Step S03: Sintering

In Step S03, by sintering the ceramic body 111 obtained in Step S02, the ceramic body 11 of the multi-layer ceramic capacitor 10 shown in FIGS. 1 to 3 is prepared. By Step S03, the multi-layer unit 116 turns into the multi-layer unit 16 and the first and second side margins 117a and 117b respectively turn into the first and second side margins 17a and 17b.

In this embodiment, by Step S03, the first inner layer Ru1 of each of the first and second side margins 117a and 117b turns into the region inside the first and second side margins 17a and 17b. Similarly, the first outer layer Ru2 turns into the region outside each of the first and second side margins 17a and 17b. As a result, the first and second side margins 17a and 17b including the first inner region R11 and the first outer region R12 having the above-mentioned composition are formed.

Since the total concentration of Mn and Mg in the first outer layer Ru2 is high, refinement of crystal grains and densification of ceramics are promoted by sintering. Therefore, the first outer region R12 having high mechanical strength is formed. Further, Mn and/or Mg in the first outer layer Ru2 can disperse during sintering, but the presence of the first inner layer Ru1 having a low total concentration of Mn and Mg suppresses the diffusion of Mn and/or Mg into the multi-layer unit 116.

Meanwhile, in the first inner layer Ru1, a glass phase precipitates due to the presence of Si. As a result, it is possible to enhance flexibility the first inner region R1 of each of the first and second side margins 17a and 17b and release stress due to electrolytic strain.

The sintering temperature in Step S03 can be determined on the basis of the sintering temperature of the ceramic body 111. For example, if a barium titanate ($BaTiO_3$)-based material is used, the sintering temperature can be set to approximately 1000 to 1300° C. Additionally, sintering can be performed in a reduction atmosphere or a low-oxygen partial pressure atmosphere, for example.

3.4 Step S04: Formation of External Electrode

In Step S04, by forming the first and second external electrodes 14 and 15 on both end portions in the X-axis direction of the ceramic body 11 obtained in Step S03, the multi-layer ceramic capacitor 10 shown in FIGS. 1 to 3 is prepared. The method of forming the first and second external electrodes 14 and 15 in Step S04 can be arbitrarily selected from well-known methods.

Through the above step, the multi-layer ceramic capacitor 10 is completed. In this production method, the first and second side margins 117a and 117b are formed on the first and second side surfaces S1 and S2 of the multi-layer unit 116, from which the first and second internal electrodes 112 and 113 are exposed. Thus, the positions of the end portions of the first and second internal electrodes 12 and 13 in the Y-axis direction in the ceramic body 11 fall within the range of 0.5 µm.

4. Example

As Examples of the first embodiment, samples of multi-layer ceramic capacitors according to Examples 1 to 4 and Comparative Examples 1 to 3 were prepared on the basis of the production method described above. In each sample, the Steps S01 to S04 described above were performed using a ceramic sheet including a ceramic green sheet containing barium titanate as a main component and an internal electrode formed of a conductor containing Ni. The number of laminated ceramic sheets in which the internal electrode were formed was 470.

The size of each sample after sintering was approximately 1.0 mm in the X-axis direction, approximately 0.5 mm in the Y-axis direction, and approximately 0.5 mm in the Z-axis direction. The average thickness of the ceramic layer was 0.5 µm, and the average thickness of the internal electrode was 0.4 µm.

In each sample, the distribution of Mn or Mg and Si was adjusted by changing the number of layers and composition of the side margin. Note that the thickness in the Y-axis direction of the side margin of each sample after sintering was as shown in Table 1.

In the sample according to Example 1, a side margin of two layers including a first outer layer and a first inner layer was formed. Mn was added to the first outer layer to have a concentration of Mn higher than those of the first inner layer and the ceramic layer. Si was added to the first inner layer to have a concentration of Si higher than those of the first outer layer and the ceramic layer.

In the sample according to Example 2, a side margin of two layers including a first outer layer and a first inner layer was formed. Mg was added to the first outer layer to have a concentration of Mg higher than those of the first inner layer and the ceramic layer. Si was added to the first inner layer to have a concentration of Si higher than those of the first outer layer and the ceramic layer.

In the sample according to Example 3, a side margin of two layers including a first outer layer and a first inner layer was formed. Mn was added to the first outer layer to have a concentration of Mn higher than those of the first inner layer and the ceramic layer. Si was added to the first inner layer and the first outer layer to have the same concentration of Si, which is higher than that of the ceramic layer.

In the sample according to Example 4, a side margin of two layers including a first outer layer and a first inner layer was formed. Mg was added to the first outer layer to have a concentration of Mg higher than those of the first inner layer and the ceramic layer. Si was added to the first inner layer and the first outer layer to have the same concentration of Si, which is higher than that of the ceramic layer.

In the sample according to Comparative Example 1, a side margin of one layer was formed. Mn and Si were added to the side margin to be uniformly distributed throughout the side margin.

In the sample according to Comparative Example 2, a side margin of one layer was formed. Mn and Si were added to the side margin to be uniformly distributed throughout the side margin.

In the sample according to Comparative Example 3, a side margin of two layers including a first outer layer and a first inner layer was formed. Mn was added to the first inner layer to have a concentration of Mn higher than those of the first outer layer and the ceramic layer. Si was added to the first outer layer to have a concentration of Si higher than those of the first inner layer and the ceramic layer.

Each sample after firing was polished to the center in the X-axis direction such that the Y-Z cross section was exposed, and the distribution of Mn, Mg, and Si of the cross section was evaluated by EPMA mapping analysis. The results are shown in Table 1.

In the distribution of each element in Table 1, the "Inside" means that many elements are distributed in the first inner region of the side margin. The "Outside" means that many elements are distributed in the first outer region of the side margin. The "Uniform" means that elements are uniformly distributed throughout the side margin.

TABLE 1

|  | Side margin thickness | Mn distribution | Mg distribution | Si distribution | Withstand voltage | Electrostatic capacity | Appearance defect rate |
|---|---|---|---|---|---|---|---|
| Comparative Example 1 | 18 μm | Uniform | — | Uniform | A(15 V) | B(10.2 μF) | B(2.5%) |
| Comparative Example 2 | 13 μm | Uniform | — | Uniform | B(12 V) | B(10.6 μF) | B(2.0%) |
| Comparative Example 3 | 13 μm | Inside | — | Outside | C(9 V) | C(8.2 μF) | C(5.5%) |
| Example 1 | 13 μm | Outside | — | Inside | A(15 V) | A(12.5 μF) | A(0.5%) |
| Example 2 | 13 μm | — | Outside | Inside | A(15 V) | A(12.3 μF) | A(1.0%) |
| Example 3 | 13 μm | Outside | — | Uniform | A(14 V) | A(12.2 μF) | A(1.0%) |
| Example 4 | 13 μm | — | Outside | Uniform | A(14 V) | A(12.0 μF) | A(1.5%) |

The breakdown voltage (BDV) of 50 samples according to each of Examples and Comparative Examples was measured and the average value thereof was calculated as the withstand voltage. The results are shown in Table 1. Note that as the breakdown voltage, a voltage at the time of dielectric breakdown caused by increasing the voltage applied to each sample at 25° C. was used. Further, as evaluation of the withstand voltage, 13 V or more, 10 V or more and less than 13 V, and less than 10 V were respectively evaluated as A, B, and C.

As shown in Table 1, in Examples 1 to 4, evaluation of the withstand voltage was A while the thickness of the side margin was thin, i.e., 13 μm. Meanwhile, in Comparative Examples 2 and 3 in which the thickness of the side margin was 13 μm, evaluation of the withstand voltage was B and C, respectively. Further, in Comparative Example 1 in which the thickness of the side margin was thick, i.e., 18 μm, evaluation of the withstand voltage was A.

As a result, it was found that the withstand voltage could be improved by distributing a large amount of Mn or Mg into the first outer region and uniformly distributing Si or distributing a large amount of Si into the first inner region even in the case where the side margin was thin, i.e., 13 μm or less.

Subsequently, the electrostatic capacity of 50 samples according to each of Examples and Comparative Examples was measured and the average value in each of Examples and Comparative Examples was calculated. The results are shown in Table 1. As evaluation of the electrostatic capacity, 12.0 μF or more, 10.0 μF or more and less than 12.0 μF, and less than 10.0 μF were respectively evaluated as A, B, and C.

As shown in table 1, in Examples 1 to 4 in which a large amount of Mn or Mg was distributed into the first outer region, evaluation of the electrostatic capacity was A. Meanwhile, evaluation of the electrostatic capacity was B in Comparative Examples 1 and 2 in which Mn was uniformly distributed, and evaluation of the electrostatic capacity was C in Comparative Example 3 in which a large amount of Mn was distributed into the first inner region. From this result, it was found that the diffusion of Mn or Mg into the multi-layer unit was suppressed by distributing a large amount of Mn or Mg into the first outer region and the decrease in the electrostatic capacity could be suppressed.

Subsequently, the presence or absence of appearance defects in 200 samples according to each of Examples and Comparative Examples was visually determined. In each of Examples and Comparative Examples, the rate of the number of samples having an appearance defect in the 200 samples was calculated as the appearance defect rate. The results are shown in Table 1. As evaluation of the appearance defect rate, less than 2.0%, 2.0% or more and less than 5.0%, and 5.0% or more were respectively evaluated as A, B, and C.

As shown in Table 1, in Examples 1 to 4, evaluation of the appearance defect rate was A. Meanwhile, evaluation of the appearance defect rate was B in Comparative Examples 1 and 2, and evaluation of the appearance defect rate was C in Comparative Example 3. From this result, it was found that the wear resistance of the side margin was improved by distributing a large amount of Mn or Mg into the first outer region and uniformly distributing Si or distributing a large amount of Si into the first inner region, and the appearance defects could be suppressed.

From the above, it was found that the withstand voltage and the electrostatic capacity were improved and the appearance defect rate decreased by distributing a large amount of Mn or Mg into the first outer region and uniformly distributing Si or distributing a large amount of Si into the first inner region. Further, from the results of Examples 1 and 2 and the results of Examples 3 and 4, it is conceivable that Mn and Mg have similar effects on the withstand voltage characteristics, the electrostatic capacity, and the wear resistance.

II Second Embodiment

Although the first inner region R11 and the first outer region R12 of the first and second side margins 17a and 17b have predetermined element distribution in the first embodiment, also first and second covers 39a and 39b may have similar element distribution.

Note that in the following embodiment, the same configurations as those in the first embodiment will be denoted by the same reference symbols and description thereof will be omitted.

Figure 8:
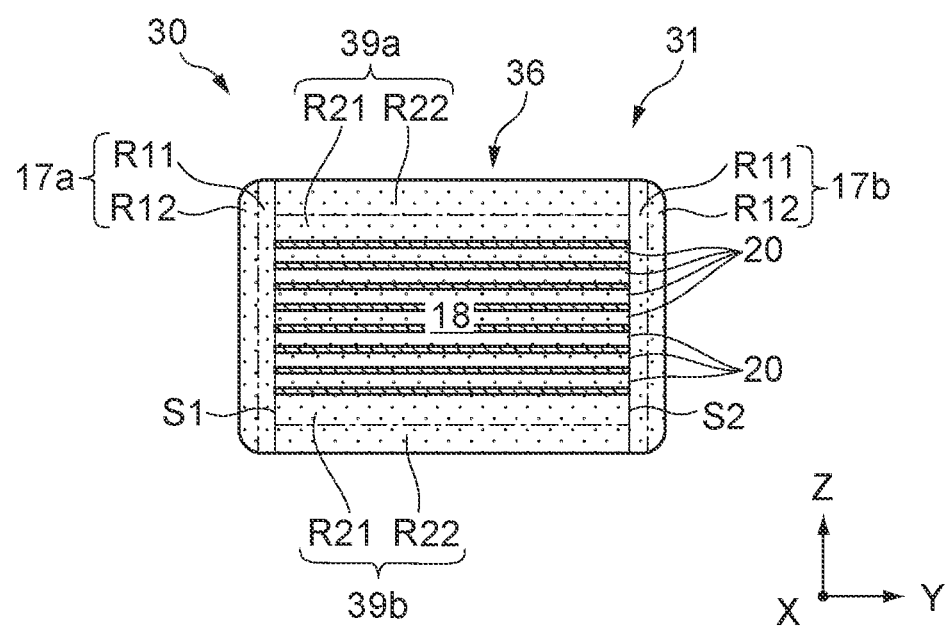
FIG. 8 is a cross-sectional view of a multi-layer ceramic capacitor according to a second embodiment of the present disclosure.

FIG. 8 is a cross-sectional view of a multi-layer ceramic capacitor 30 according to a second embodiment of the present disclosure, and shows the cross section of at the same position to that in FIG. 3.

The multi-layer ceramic capacitor 30 includes a ceramic body 31 different from that in the first embodiment and the first external electrode 14 and the second external electrode 15 similar to those in the first embodiment. Note that in FIG. 8, illustration of the first and second external electrodes 14 and 15 is omitted.

The ceramic body 31 includes a multi-layer unit 36 different from that in the first embodiment and the first side margin 17a and the second side margin 17b similar to those in the first embodiment.

The multi-layer unit 36 includes the capacitance forming unit 18 similar to that in the first embodiment and a first cover 39a and a second cover 39b different from those in the first embodiment.

The first and second covers 39a and 39b are each formed of insulating ceramics and are favorably formed of dielectric ceramics having a composition similar to those of the ceramic layers 20. Further, in this embodiment, the first and second covers 39a and 39b each contain at least one of manganese (Mn) or magnesium (Mg) and silicon (Si).

In this embodiment, the first cover 39a and the second cover 39b are each equally divided, in the Z-axis direction, into a second inner region R21 that is in contact with the capacitance forming unit 18 and a second outer region R22, and the composition of each region is adjusted.

The second inner region R21 and the second outer region R22 are regions divided by a virtual plane that equally divides, in the Z-axis direction, the central portion of each of the first and second covers 39a and 39b in the X-axis direction and the Y-axis direction. The virtual plane is a plane parallel to the X-Y plane. That is, the dimensions in the Z-axis direction of the central portion of the second inner region R21 in the X-axis direction and the Y-axis direction and the dimensions in the Z-axis direction of the central portion of the second outer region R22 in the X-axis direction and the Y-axis direction are equal to each other.

The total concentration of Mn and Mg in the second outer region R22 is, for example, higher than the total concentration of Mn and Mg in the second inner region R21 and higher than the total concentration of Mn and Mg in the plurality of ceramic layers 20. As a result, refinement of crystal grains and densification of ceramics in the second outer region R22 are promoted and the wear resistance on the surface is improved. Therefore, the appearance defects of the multi-layer ceramic capacitor 10 due to scratches and the like during handling are effectively suppressed.

Further, since the total concentration of Mn and Mg in the second inner region R21 is relatively low, the diffusion of Mn and/or Mg into the ceramic layers 20 is suppressed. As a result, the decrease in the dielectric constant of the ceramic layers 20 is suppressed and the decrease in the electrostatic capacity of the multi-layer ceramic capacitor 30 is suppressed.

Further, the concentration of Si in the second inner region R21 is, for example, equal to or higher than the concentration of Si in the second outer region R22 and higher than the concentration of Si in the plurality of ceramic layers 20.

With the configuration described above, the distribution of Mn, Mg, and Si in the second inner region R21 and the second outer region R22 can be caused to correspond to the distribution of Mn, Mg, and Si in the first inner region R11 and the first outer region R12 of the first and second side margins 17a and 17b. As described above, the distribution of the elements described above can affect the sintering behavior of each region. For this reason, with the configuration described above, it is possible to bring the sintering behavior of the first and second covers 39a and 39b closer to the sintering behavior of the first and second side margins 17a and 17b, and reduce the stress generated between the first and second covers 39a and 39b and the first and second side margins 17a and 17b. Therefore, it is possible to suppress structural defects such as cracks due to sintering.

The first cover 39a and the second cover 39b according to this embodiment are formed by, for example, laminating ceramic sheets having different compositions.

Specifically, the unsintered first and second covers 39a and 39b each include a second inner layer and a second outer layer. The second inner layer is a layer adjacent to a capacitance forming unit. The second outer layer is a layer laminated outside the second inner layer in the Z-axis direction. Note that the second inner layer and the second outer layer may each include a single ceramic sheet and may each include a plurality of ceramic sheets.

The second outer layer contains at least one of Mn or Mg. The total concentration of Mn and Mg in the second outer layer is higher than the total concentration of Mn and Mg in the ceramic sheet forming the second inner layer and the ceramic layers 20.

The second inner layer contains Si. The concentration of Si in the second inner layer is equal to or higher than the concentration of Si in the second outer layer and higher than the concentration of Si in the ceramic sheet forming the ceramic layers 20.

Since the unsintered first and second covers 39a and 39b each include the second inner layer and the second outer layer having the configuration described above, it is possible to form the first and second covers 39a and 39b including the second inner region R21 and the second outer region R22 after sintering.

III Other Embodiments

While the embodiments of the present disclosure have been described, the present disclosure is not limited to the embodiments described above, and it should be appreciated that the present disclosure may be variously modified without departing from the gist of the present disclosure.

For example, although the unsintered first and second side margins 117a and 117b each include the first inner layer Ru1 and the first outer layer Ru2 having different compositions in the first embodiment, the present disclosure is not limited thereto. For example, the unsintered first and second side margins 117a and 117b may each include a three or more layers such that the total concentration of Mn and Mg is higher toward the outside. In this case, the three or more layers may have the same concentration of Si or a concentration of Si that increases toward the inside. Also with this configuration, it is possible to form the first and second side margins 17a and 17b including the first inner region R11 and the first outer region R12 having the composition described above after sintering.

Similarly, also in the second embodiment, the unsintered first and second covers 39a and 39b may each include three or more layers such that the total concentration of Mn and Mg increases toward the outside. In this case, the three or more layers may have a uniform concentration of Si or a concentration of Si that increases towards the inside.

It will be apparent to those skilled in the art that various modifications and variations can be made in the present disclosure without departing from the spirit or scope of the disclosure. Thus, it is intended that the present disclosure cover modifications and variations that come within the scope of the appended claims and their equivalents. In particular, it is explicitly contemplated that any part or whole of any two or more of the embodiments and their modifications described above can be combined and regarded within the scope of the present disclosure.

What is claimed is:

1. A multi-layer ceramic capacitor, comprising:
a multi-layer unit that includes a plurality of ceramic layers laminated in a direction of a first axis and a plurality of internal electrodes disposed between the plurality of ceramic layers, positions of end portions of the plurality of internal electrodes in a direction of a second axis perpendicular to the first axis falling within a range of 0.5 µm in the direction of the second axis; and
a first side margin and a second side margin each containing at least one of manganese or magnesium and silicon and facing each other in the direction of the second axis with the multi-layer unit sandwiched therebetween, wherein
when each of the first side margin and the second side margin is equally divided, in the direction of the second axis, into a first inner region and a first outer region, the first inner region being in contact with the multi-layer unit,
a concentration of silicon in the first inner region is higher than a concentration of silicon in the first outer region and higher than a concentration of silicon in the plurality of ceramic layers,
wherein, the first inner region has a uniform concentration of silicon over its entire area, and the first outer region has a uniform concentration of silicon over its entire area.

2. The multi-layer ceramic capacitor according to claim 1, wherein
dimensions of each of the first side margin and the second side margin in the direction of the second axis are 13 µm or less.

3. The multi-layer ceramic capacitor according to claim 1, wherein
the multi-layer unit includes
a capacitance forming unit including the plurality of ceramic layers and the plurality of internal electrodes, and
a first cover and a second cover each containing at least one of manganese or magnesium and silicon, the first cover and the second cover facing each other in the direction of the first axis with the capacitance forming unit sandwiched therebetween, wherein
when each of the first cover and the second cover is equally divided, in the direction of the first axis, into a second inner region and a second outer region, the second inner region being in contact with the capacitance forming unit,
a concentration of silicon in the second inner region is equal to or higher than a concentration of silicon in the second outer region and higher than a concentration of silicon in the plurality of ceramic layers.

4. The multi-layer ceramic capacitor according to claim 1, wherein
a thickness of each of the plurality of internal electrodes in the direction of the first axis is 0.4 µm or less.

* * * * *